(12) United States Patent
Haas

(10) Patent No.: US 9,706,719 B2
(45) Date of Patent: Jul. 18, 2017

(54) WATER CONTAINMENT SYSTEM

(71) Applicant: Ryan Haas, Villa Rica, GA (US)

(72) Inventor: Ryan Haas, Villa Rica, GA (US)

(*) Notice: Subject to any disclaimer, the term of this patent is extended or adjusted under 35 U.S.C. 154(b) by 91 days.

(21) Appl. No.: 14/640,050

(22) Filed: Mar. 6, 2015

(65) Prior Publication Data

US 2015/0250108 A1 Sep. 10, 2015

Related U.S. Application Data

(60) Provisional application No. 61/949,047, filed on Mar. 6, 2014.

(51) Int. Cl.
| | | |
|---|---|---|
| A01G 9/02 | (2006.01) | |
| A01G 1/04 | (2006.01) | |
| A01G 31/06 | (2006.01) | |
| A01G 27/00 | (2006.01) | |
| A01G 9/04 | (2006.01) | |

(52) U.S. Cl.
CPC ............ *A01G 9/022* (2013.01); *A01G 9/025* (2013.01); *A01G 9/045* (2013.01); *A01G 27/008* (2013.01); *A01G 31/06* (2013.01); *Y02P 60/216* (2015.11); *Y10T 29/49826* (2015.01); *Y10T 137/5762* (2015.04)

(58) Field of Classification Search
CPC ........ A01G 9/022; A01G 9/025; A01G 31/06; A01G 5/04; A01G 31/00; A01G 27/008; Y02P 60/216
See application file for complete search history.

(56) References Cited

U.S. PATENT DOCUMENTS

| | | | | |
|---|---|---|---|---|
| 1,989,403 | A * | 1/1935 | Dauernheim | A01G 9/028 47/39 |
| 2,051,094 | A * | 8/1936 | Loughridge | A01G 31/06 47/61 |
| 5,095,649 | A * | 3/1992 | Brownlee | A47G 7/041 47/41.01 |
| 5,355,837 | A * | 10/1994 | Reyes | A01K 1/0107 119/161 |
| 5,394,647 | A * | 3/1995 | Blackford, Jr. | A01G 31/02 47/59 R |
| 5,860,249 | A * | 1/1999 | Holtkamp, Jr. | A01G 27/06 47/79 |
| 9,345,207 | B2 * | 5/2016 | Juncal | A01G 31/02 |

(Continued)

*Primary Examiner* — Atif Chaudry
(74) *Attorney, Agent, or Firm* — Peter Detorre, Esq.

(57) ABSTRACT

The water containment system(s) disclosed herein may include one or more trays operably connected by piping. In some implementations, the trays may be configured to support plants thereon and to catch water used to irrigate these plants. In this way, the collected water may be reclaimed and reused. In some implementations, the water containment system may help prevent water from leaking onto adjacent surfaces. In this way, a potential water hazard may be eliminated. In some implementations, each tray may include a housing with at least one grate covering an interior opening. In some implementations, the housing of each tray may have one or more sloped surface located within its interior. In some implementations, a drain may be located at or near the lowest point within the interior of the housing. In this way, water flowing through the interior of a tray's housing may drain out.

12 Claims, 9 Drawing Sheets

(56) References Cited

U.S. PATENT DOCUMENTS

2006/0048469 A1\* 3/2006 MacLean ............. A01K 1/0103
　　　　　　　　　　　　　　　　　　　　　52/220.3
2009/0241442 A1\* 10/2009 MacLean ............. A01K 1/0103
　　　　　　　　　　　　　　　　　　　　　52/220.3

\* cited by examiner

WATER CONTAINMENT SYSTEM

CROSS REFERENCE TO RELATED APPLICATION

This application claims the benefit of U.S. Provisional Application No. 61/949,047, which was filed on Mar. 6, 2014, and is incorporated herein by reference in its entirety.

TECHNICAL FIELD

This disclosure relates to implementations of a water containment system.

BACKGROUND

Plant nurseries are places where plants are propagated and grown. They also include retail nurseries which sell to the public. Many nurseries house and display plants on shelves constructed of plywood or a similar material. These shelves are often unsightly and provide no way to collect the water used to water the plants stored thereon. Water runoff from these shelves may create a potential water hazard whereby an employee or customer could become injured as a result of slipping and falling. Further, water runoff many contain fertilizers or other chemicals which may be harmful to the environment. The prior art has attempted to solves these and other problems through the use of vertical display racks configured to collect water runoff.

U.S. Patent Publication No. 2012/0011768 ("'768 publication") discloses a plant display rack. The disclosed display rack provides a plurality of shelves where each shelf has a slanted plant support surface. The slanted surfaces coerce runoff water to an exit aperture and into a reservoir.

However, the plant display rack disclosed in the '768 publication has several disadvantages. First, the vertical orientation of the shelves (i.e., each shelf being positioned directly above or below another) may prevent plants not positioned on the top shelf from being exposed to natural sunlight or other overhead lighting. As a result, an artificial light source will need to be provided for plants housed on shelves positioned below the top shelf. This will increase the cost associated with the use of such a display rack. Second, there is no drawer into which information about the plants displayed on a particular shelf may be stored. Third, without a filter the exit aperture may become blocked causing water to build up within the support trays. This build up of water could kill plants through oversaturation of their roots and create a water hazard.

DETAILED DESCRIPTION

Figure 1A:
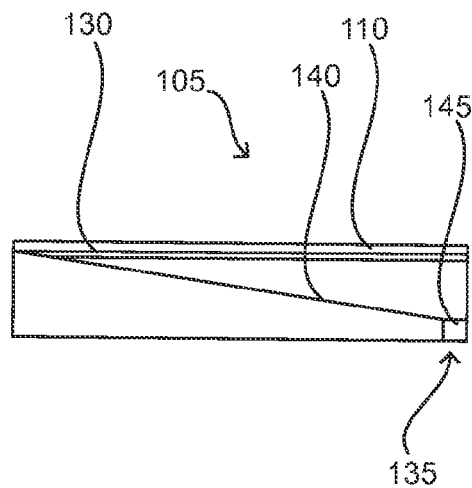
FIG. 1A illustrates a side-cutaway view of a tray according to the present disclosure.
Figure 1B:
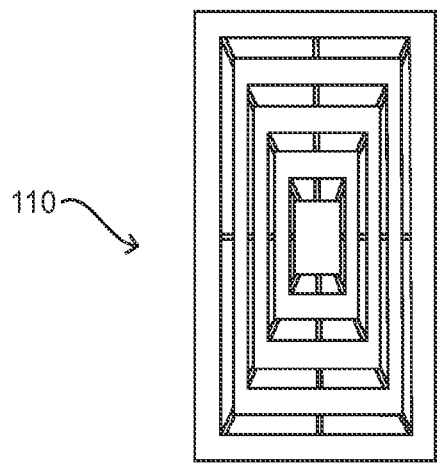
FIG. 1B illustrates a top view of a grate according to the present disclosure.
Figure 2A:
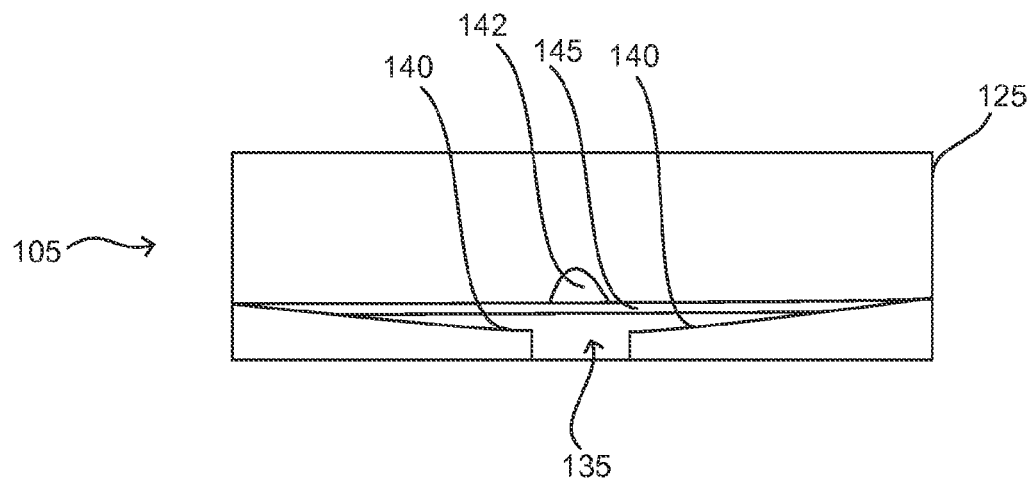
FIGS. 2A-2B each illustrate a front a cutaway view of a tray constructed in accordance with the present disclosure.
Figure 2B:
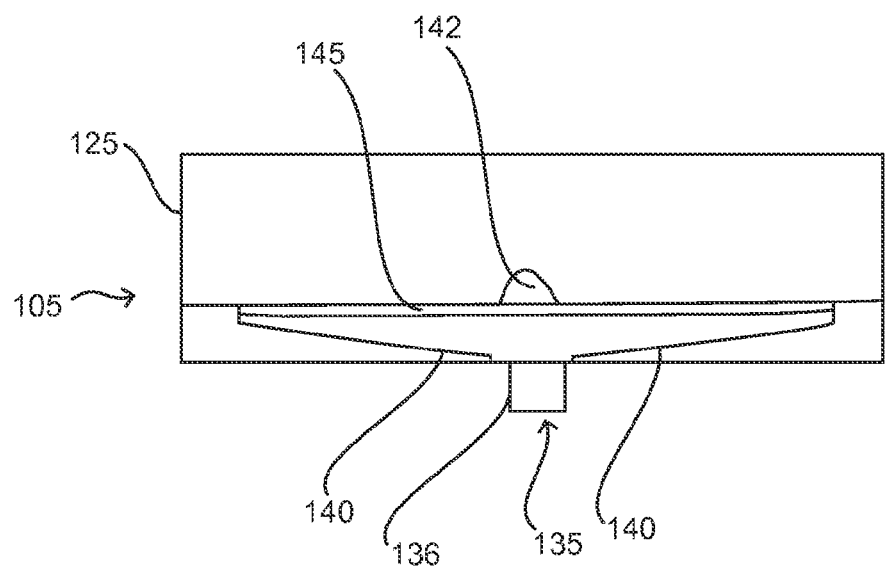

Implementations of a water containment system are provided. The water containment system(s) disclosed herein may comprise one or more trays operably connected by piping. In some implementations, the piping of the water containment system(s) may be supported by one or more brackets that are in turn secured to a secondary structure (e.g., shelf, table, wall, etc. . . . ). In some implementations, the trays may be configured to support plants thereon and to catch water used to irrigate these plants. In this way, the collected water may be reclaimed and reused. In some implementations, the water containment system may help prevent water from leaking onto adjacent surfaces. In this way, a potential water hazard may be eliminated.

In some implementations, each tray of a water containment system(s) may be comprised of a housing with at least one grate covering an interior opening. In some implementations, the housing may have the general shape of a square or a rectangle. In some implementations, one or more exterior sides of the housing may have a company name, logo, or combination thereof or any other insignia thereon. In some implementations, the housing may be manufactured from metal, polymer, or wood, or a combination thereof.

In some implementations, the housing of each tray may have a sloped surface located within its interior. In some implementations, the housing may have a plurality of sloped surfaces located within its interior. In some implementations, a housing may be provided with a drain. In some implementations, the drain may be located at or near the lowest point within the housing. In this way, water flowing through the interior of a tray's housing may drain out.

In some implementations, the drain of a tray may be equipped with a filter used to filter out contaminants and/or debris from water flowing through the drain. In this way, debris may be prevented from causing a blockage in connected piping.

FIGS. 1A-6B illustrate implementations of a water containment system 100, 200, 300 according to the present disclosure. Implementations of a water containment system according to the present disclosure can be configured to catch water used to irrigate plants stored on top of the trays 105 (FIGS. 1A-2B), 205 (FIGS. 3A-3D), 305 (FIG. 6A-6B) of the systems 100, 200, 300, respectively. In this way, the collected water may be reclaimed and reused. In some implementations, the water containment system may help prevent water from leaking onto surfaces (e.g., the ground) adjacent the one or more trays of the water containment system. In this way, a potential water hazard may be eliminated.

As shown in FIGS. 1A-6B, implementations of the water containment systems 100, 200, 300 may comprise at least one tray 105, 205, 305, respectively, operably connected by piping 115 (the piping 115 can be the same or different in all the implementations; for simplicity, the piping is labeled the same in all implementations but can be different). In some implementations, the piping 115 may be supported by one or more brackets 120 (the brackets 120 can be the same or different in all the implementations; for simplicity, the brackets are labeled the same in all implementations but can be different).

In some implementations, each tray 105, 205, 305 of the water containment systems 100, 200, 300 may be comprised of a housing 125, 225, 325 with at least one grate 110, 210, 310, respectively, covering an interior opening. In some implementations, the housing may have the general shape of a square or a rectangle. In some implementations, the housing may be any suitable shape. In some implementations, one or more exterior sides of the housing may have an advertisement thereon comprised of a company name, logo, or combination thereof or any other insignia thereon. In some implementations, the housing may be manufactured from metal, polymer, or wood, or a combination thereof. In some implementations, the housing may be manufactured from any suitable material.

In some implementations, the housing may have a sloped surface located within its interior (see, e.g., FIG. 1A a side-cutaway view of a tray, element 140). In some implementations, the housing may have a plurality of sloped surfaces located within its interior (see, e.g., FIGS. 2A-2B, element 140 and FIG. 3B, element 240).

In some implementations, a housing 125, 225, 325 may be provided with a drain 135, 235, 335, respectively. In some implementations, the drain may extend through the bottom side of the housing (see, e.g., FIG. 4E, element 236). In some implementations, the drain may be located at or near the lowest point within the housing. In this way, water flowing through the interior of a tray's housing may drain out. In some implementations, the drain may be located at or near the bottom of a sloped surface (see, e.g., FIG. 1A. element 135). In some implementations, a drain may be located on one end of the housing (see, e.g., FIG. 1A, element 135 and FIG. 3B, element 235). In some implementations, a drain 335 may be located along a longitudinal side of the housing (see, e.g., FIGS. 6A-6B). In some implementations, a drain may be located in any suitable location which facilitates the drainage of water collected within the interior of a tray of the water containment system.

In some implementations, a drain 135, 235, 335 may be equipped with a filter 145, 245, 345, respectively, to filter out contaminants and/or debris from water flowing through the drain. In some implementations, the filter may be removable. In some implementations, the filter may have a handle thereon (see, e.g., FIG. 2A, element 142). In some implementations, the filter may be a piece of grating configured to fit over the drain of a tray. In some implementations, the filter may be a piece of plastic having appropriately sized opening therethrough. In some implementations, the openings of the filter can be configured to trap debris while still allowing water to flow through the drain. In some implementations, the filter 145, 245 may be manufactured from a rigid plastic (see, e.g., FIG. 2B, element 145 and FIG. 3B, element 245). In some implementations, a filter may be manufactured from any suitable material.

Figure 3A:
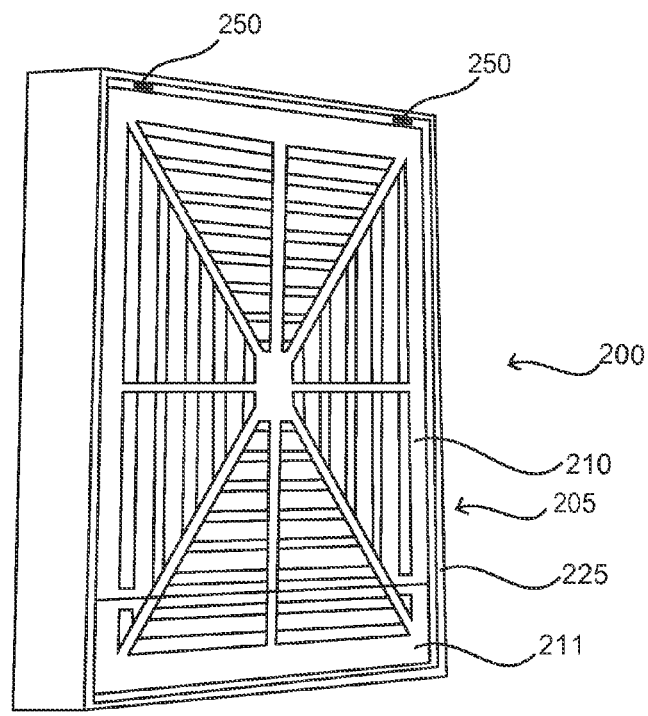
FIGS. 3A-3D illustrate another example tray according to the present disclosure.
Figure 3B:
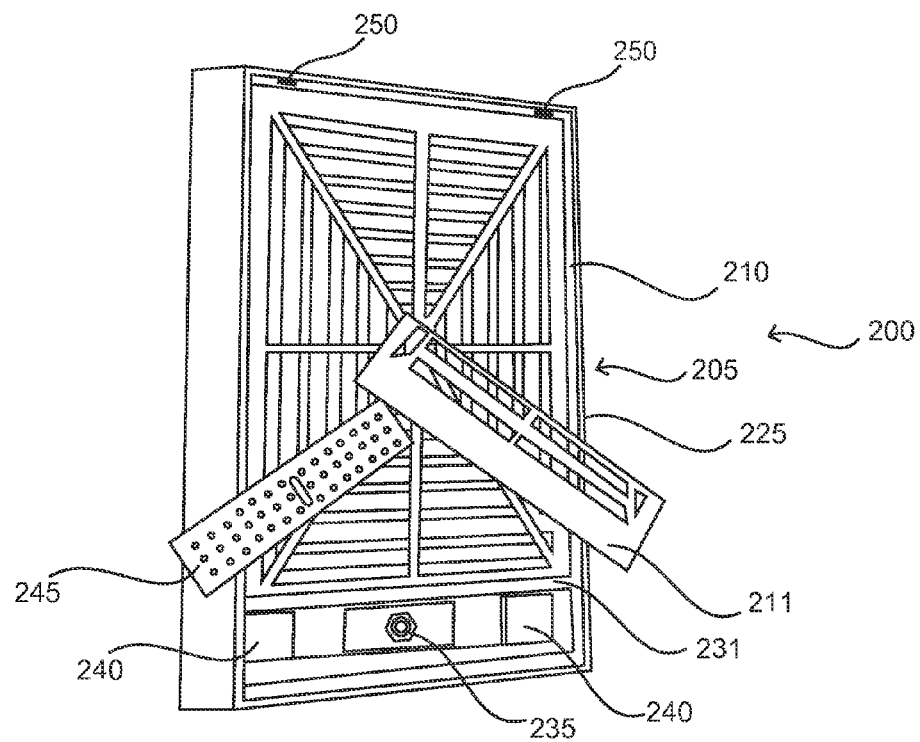
Figure 3C:
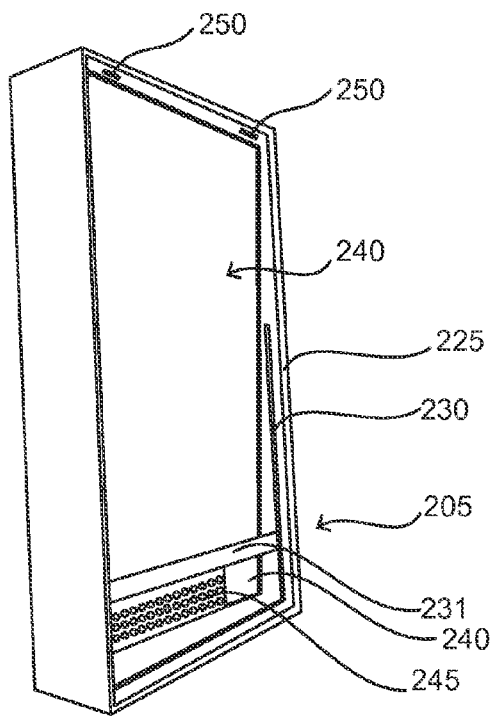

In some implementations, the housing of a tray may have an interior lip 130, 230, 330 thereon, located at or near the top of a housing 125, 225, 325, respectively, configured to support one or more grates 110, 220, 330 (see, e.g., FIG. 1A, element 130 and FIG. 3B, element 230). In some implementations, the opening into the top of the housing may be configured to support one or more grates thereon (see, e.g., FIGS. 3A-3B, element 210 and FIG. 6A-6B, element 310). In some implementations, a housing may be constructed with one or more cross beams 231 configured to support at least a portion of a grate (see, e.g., FIGS. 3B and 3C). In some implementations, there may be a support structure located within the interior portion of the housing 305 providing a lip 330 thereon configured to support at least a portion of a grate (see, e.g., FIG. 6B). In some implementations, one grate may be located over the sloped surface located within a housing's interior while a separate grate may be located over a drain (see, e.g., FIGS. 3A and 3B, elements 210 & 211 and FIG. 6B, elements 310 & 311).

Figure 6A:
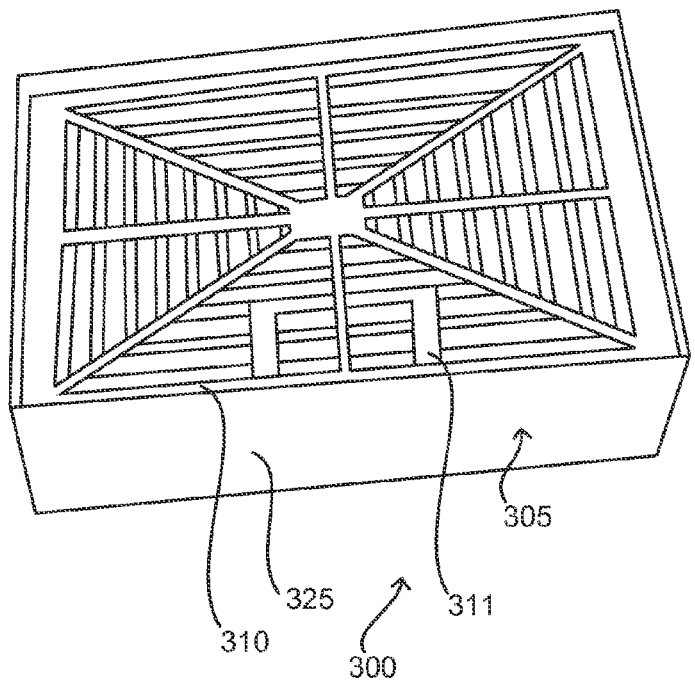
FIGS. 6A-6B illustrate yet another example tray according to the present disclosure.
Figure 6B:
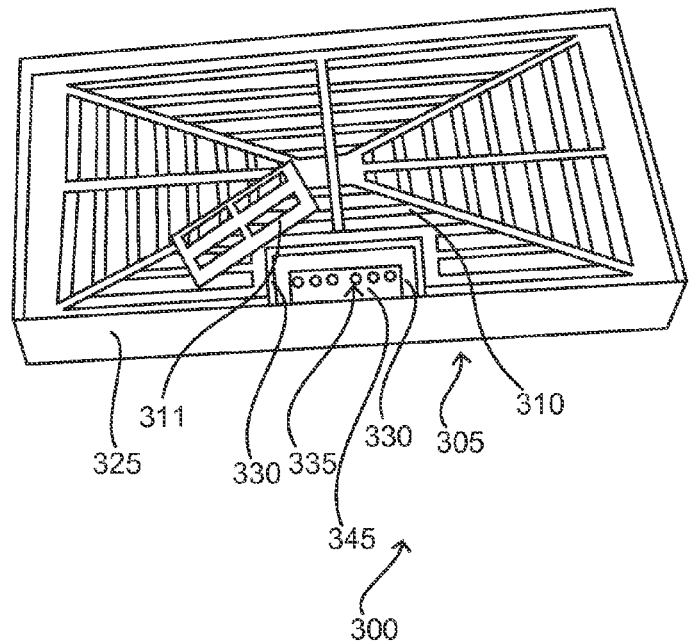

In some implementations, a grate may be constructed to cover a portion of a housings interior opening (see, e.g., FIGS. 3A and 6B). In some implementations, a grate may be constructed to cover the entirety of a housings interior opening. In some implementations, a grate may be constructed to cover a drain (see, e.g. FIGS. 3A and 6A). In some implementations, the one or more grates may be configured to support potted plants thereon. In some implementations, a grate may be configured to allow water and other liquids to flow therethrough. In some implementations, the one or more grates may be configured to allow excess water from plants supported thereon to flow therethrough into the housing of the associated tray (see, e.g., FIGS. 1A, 1B, 3A and 6A). In some implementations, the one or more grates may be manufactured from a metal. In some implementations, the one or more grates may be manufactured from a polymer. In some implementations, the one or more grates may be manufactured from any suitable material.

In some implementations, the sidewalls of the housing may have one or more openings 250 therethrough (see, e.g., FIG. 3B). The openings are placed to allow excess water accumulating within the interior of a tray's housing to drain out. In this way, oversaturation of the plants roots by an excess build up on runoff water within the interior of the housing may be prevented. In some implementations, the openings of a tray may be located above the interior lip supporting a grate (see, e.g., FIG. 3B, element 250). In some implementations, the openings may be located below an interior lip supporting a grate (not shown).

Figure 3D:
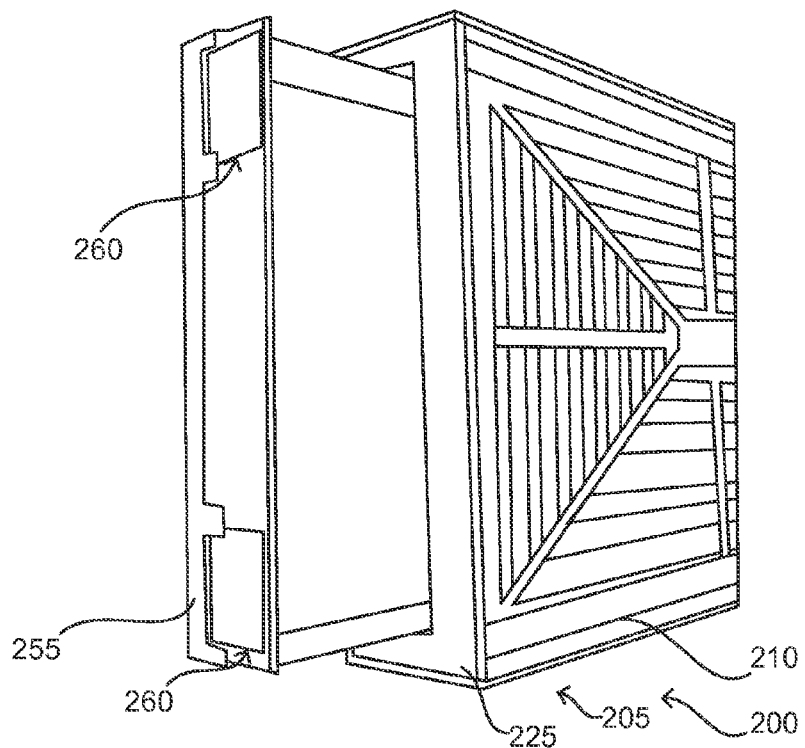

In some implementations, a drawer 255 may be provided on a tray of the water containment system (see FIG. 3D). In some implementations, the drawer 255 may be used to store literature. In some implementations, the drawer 255 may be used to store any item suitable for use with a tray and/or the water containment systems. In some implementations, the drawer 255 may be slidably connected to the housing of the tray. In some implementations, the drawer may have a handle thereon. In some implementations, the drawer may be used to store to literature regarding plants to be located on the water containment system.

In some implementations, the drawer 255 may be configured to have a message area 260 thereon (see, e.g., FIG. 3D). In some implementations, the message area 260 may be configured to receive a note card, or similar object, on which alphanumerical information may be displayed. In some implementations, the message area 260 may be configured to receive a picture or other illustration. In some implementations, the message area 260 may have an erasable and rewritable surface on which a message may be written.

In some implementations, a housing may have an extension (see, e.g., FIG. 2B, element 136 and FIG. 4E, element 236) thereon located below the drain.

Figure 4A:
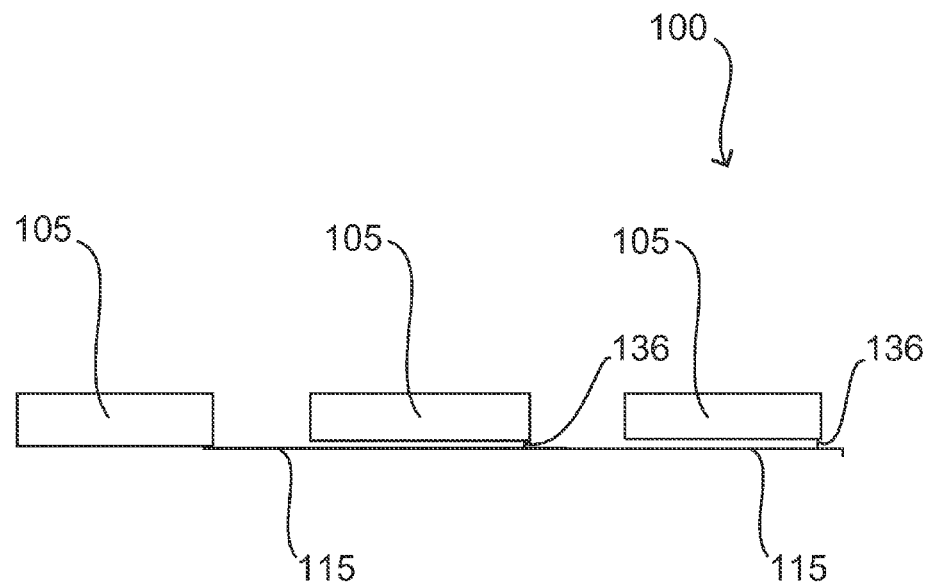
FIG. 4A illustrates an example water containment system using the tray illustrated in FIGS. 1A-2B.
Figure 4B:
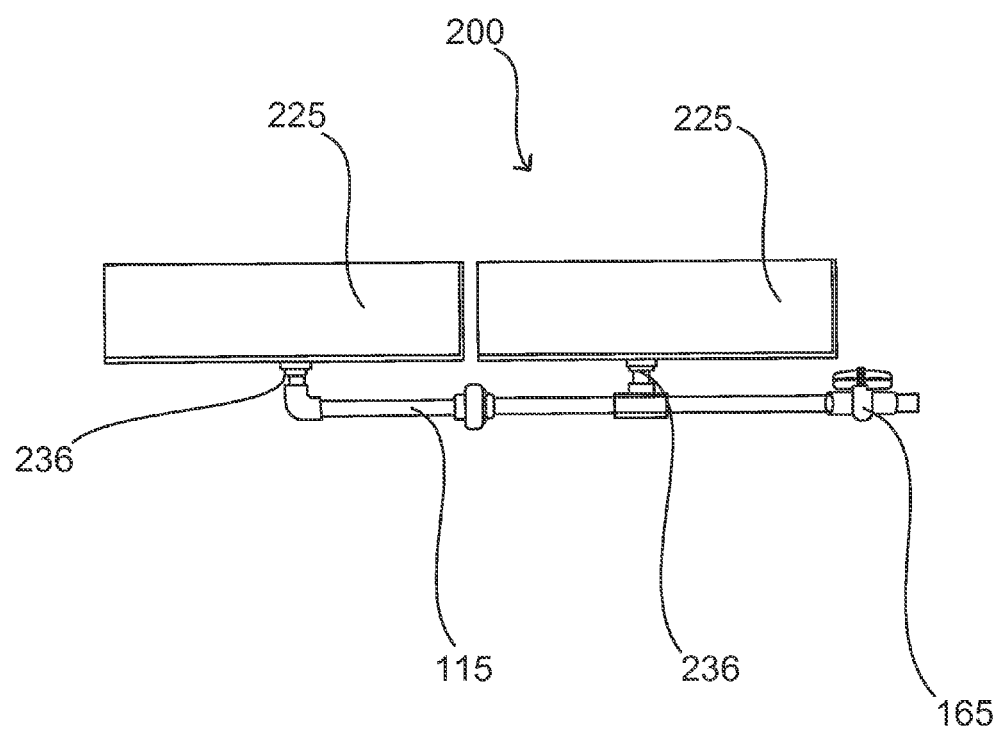
FIGS. 4B-4E illustrate another example water containment system using the tray illustrated in FIGS. 3A-3D.
Figure 4C:
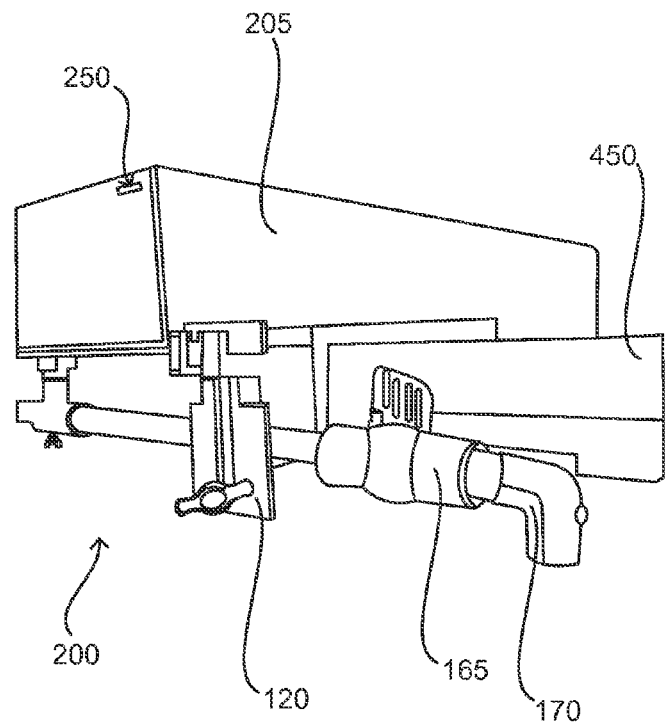
Figure 4D:
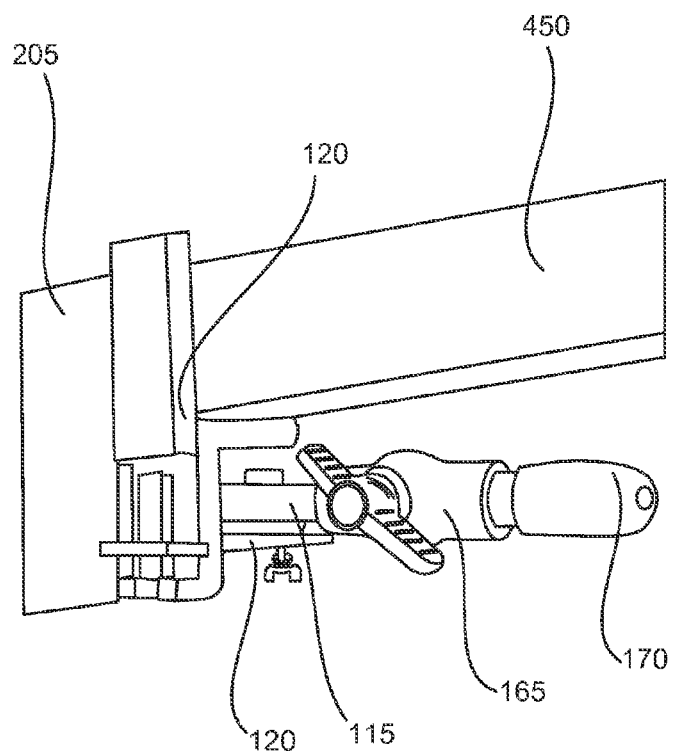
Figure 4E:
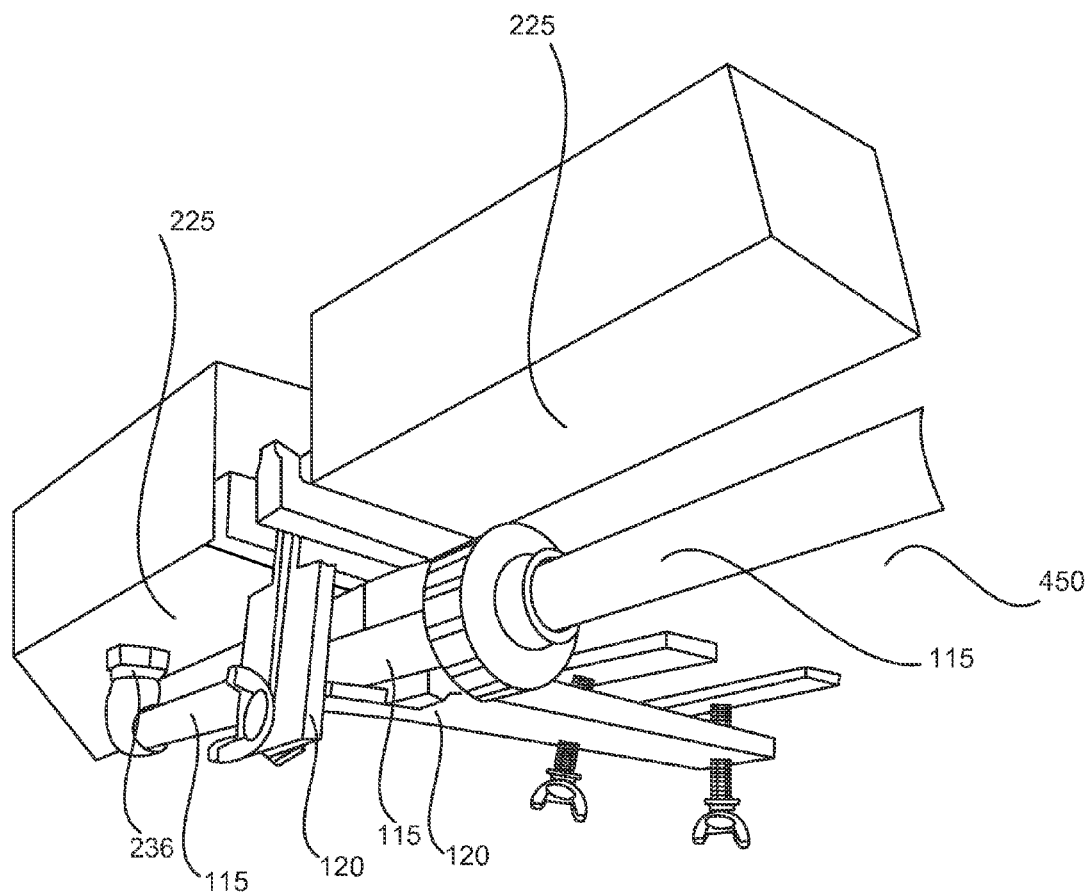

As shown in FIGS. 4A, and 4B, in some implementations, a water containment system 100 (see, e.g., FIG. 4A), 200 (see, e.g., FIG. 4B), 300 (not shown) may be comprised of a two or more trays 105, 205, 305, respectively, that are operably connected by piping 115.

In some implementations, the piping 115 may be operably connected to a tray through an extension 236 of the drain (see, e.g. 4B). In some implementations, the angle of the piping 115 may gradually increase or decrease in relationship to the connected trays based on which direction a user desires draining liquids to flow (see, e.g. FIG. 4B, the angle of the piping relative to the bottom side of the trays increases from left to right). In some implementations, the piping 115 may be equipped with a shut-off valve 165 (see, e.g. FIG. 4C). In this way, the flow of water through the piping 115 may be controlled. In some implementations, at least one end of the piping 115 may be equipped with a spigot 170 (see, e.g., FIG. 4C). In some implementations, the piping 115 may be manufactured from PVC plastic. In some implementations, the piping 115 may be manufactured from steel or other suitable metals. In some implementations, the piping 115 may be manufactured from any suitable material.

In some implementations, the piping may be supported by one or more brackets 120 (see, e.g., 4C-4E). In some implementations, a bracket 120 (see, e.g., FIG. 5A-5B) may be removably secured to a horizontal surface 450 such as a shelf or table (see, e.g., FIG. 4C-4E). In some implementations, a bracket 120 may be removably secured to a vertical surface such as a wall or a vertically oriented support structure, for example.

Figure 5A:
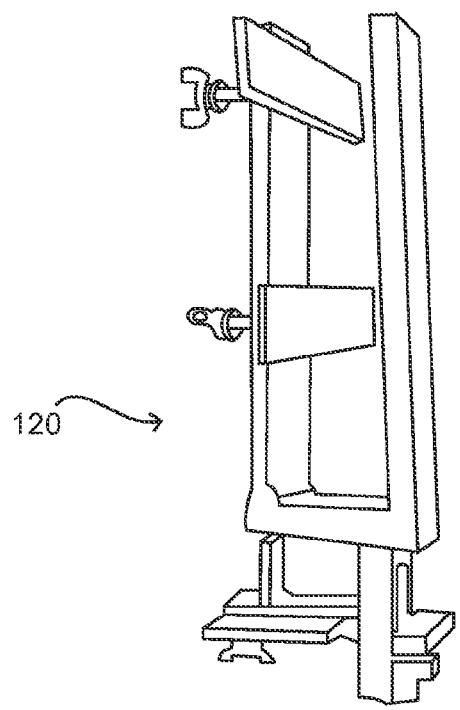
FIGS. 5A-5B illustrate the bracket according to the present disclosure.
Figure 5B:
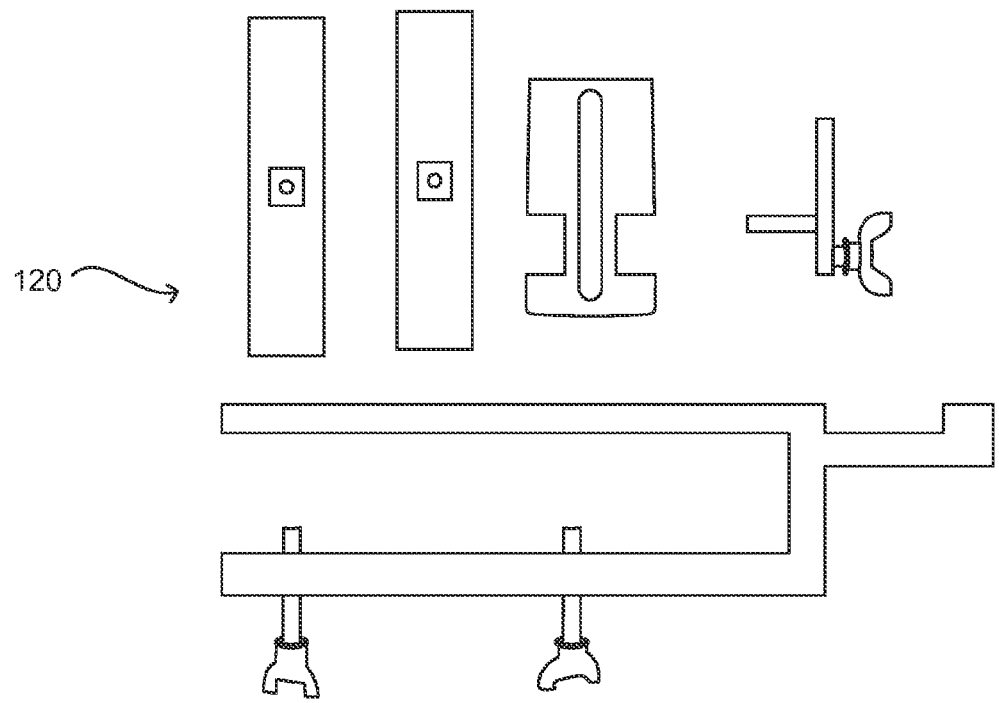

FIG. 5B shows an exploded view of an implementation of the bracket 120 disclosed herein. It is to be understood that other suitable brackets may be used without departing from the scope of the present invention.

In some implementations, the trays 105, 205, 305 of the water containment system 100, 200, 300, respectively, drain into a water reservoir. In some implementations, the piping 115 directs collected water into a water reservoir. In this way, the collected water may be stored for later reuse.

To reclaim water used to irrigate plant(s) stored on one or more trays of a water containment system, water may be sprayed or poured on the plant(s) so that it flows through the grate(s) into the interior of a tray. The water may then collect at the lowest point within the housing and thereby flow through a drain, and filter if present, into a water reservoir for reclamation and later reuse. In some implementations, the water may flow through a drain into piping which directs the water to a water reservoir or other storage location for later reuse. In some implementations, the flow of the water through the piping may be controlled through the use of a shut-off valve.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A water containment system comprising:
one or more trays configured to catch water, wherein each tray includes:
a housing having at least one sloped surface located within an interior portion thereof;
a drain located within the interior portion of the housing positioned adjacent a bottom of the at least one sloped surface, the drain extends through a bottom side of the housing;
a lip located adjacent a top side of the housing within an opening into the interior portion of the housing;
a first grate configured to overlay at least a portion of the opening into the interior portion of the housing, wherein the first grate rests on at least a portion of the lip of the housing; and
one or more openings positioned above the lip and extending through a side wall of the housing.

2. The water containment system of claim 1, further comprising a filter configured to fit within the interior portion of the housing and cover the drain.

3. The water containment system of claim 1, wherein the first grate is configured to overlay the at least one sloped surface within the interior portion of the housing; the water containment system further comprising a second grate configured to overlay the drain located within the interior portion of the housing, wherein the second grate rest on at least a portion of the lip of the housing.

4. The water containment system of claim 3, further comprising a cross beam extending between two side of the housing, the cross beam is configured to support at least a portion of the first grate and the second grate thereon.

5. The water containment system of claim 1, further comprising one or more openings positioned below the lip and extending through a side wall of the housing.

6. The water containment system of claim 1, further comprising a drawer slidably connected to the housing of the tray.

7. The water containment system of claim 6, the drawer further comprising a message area thereon.

8. The water containment system of claim 1, wherein two or more of the trays are operably connected by piping, wherein the drain of each tray is configured to drain water collected within the housing into the piping.

9. The water containment system of claim 8, further comprising one or more brackets configured to support at least a portion of the piping, the one or more brackets are configured to be removably secured to a vertical surface.

10. The water containment system of claim 8, further comprising one or more brackets configured to support at least a portion of the piping, the one or more brackets are configured to be removably secured to a horizontal surface.

11. The water containment system of claim 8, further comprising a water reservoir, wherein the drain of each tray is configured to drain water collected within the housing to the piping and into the water reservoir.

12. A method of advertising using the water containment system on claim 1, the method comprising:
placing an advertisement on at least one exterior side of a side wall of the housing.

* * * * *